F. R. BAYLIS.
SECTIONAL PNEUMATIC TUBE.
APPLICATION FILED JAN. 6, 1910.

976,840.

Patented Nov. 29, 1910.

2 SHEETS—SHEET 1.

Witnesses
H. Schneider
C. S. Martin

Francis R. Baylis, Inventor

Geo. W. Rightmire, Attorney

UNITED STATES PATENT OFFICE.

FRANCIS R. BAYLIS, OF LANSING, MICHIGAN.

SECTIONAL PNEUMATIC TUBE.

976,840.  Specification of Letters Patent.  Patented Nov. 29, 1910.

Application filed January 6, 1910. Serial No. 536,596.

*To all whom it may concern:*

Be it known that I, FRANCIS R. BAYLIS, a citizen of the United States, residing at Lansing, in the county of Ingham and State of Michigan, have invented certain new and useful Improvements in Sectional Pneumatic Tubes, of which the following is a specification.

My invention relates to improvements in pneumatic tubes adapted especially for use with tires for automobiles and similar vehicles, and comprises essentially an inner tube formed in sections adapted to be separated or assembled at will, and which when assembled and positioned for use are inflated from one point, as is usual in tire constructions comprising both an inner and an outer tube.

Difficulty has always been experienced in the use of tires having a continuous expansible inner tube, in that a puncture extending through the outer tube into the inner one affords speedy egress for the air confined therein. Consequently the tire soon flattens and is of very little use until the inner tube is replaced or repaired. The removing of an inner tube is attended with difficulty and consumes a great deal of time, and if it is repaired and replaced for use, its life is normally much shortened by the operation. To overcome this difficulty attendant upon the use of a continuous inner tube, I have devised a tube made up of sections which are constructed to be secured together in such manner as to be readily separable, and when thus secured together the expansion takes place through the connecting means without difficulty. If one of the sections is punctured, or for any reason leaks and therefore collapses, either wholly or partially, the remaining sections on either side thereof quickly expand into the vacancy thus created, and render the tube practically complete, and its use may be continued for a considerable period without removing the injured section. Not only do the remaining sections expand, but means are provided to prevent the flow of air from the adjoining sections into the leaking one, and this means comes into operation almost simultaneously with the commencement of the escape of air from the injured section. It is possible that several sections in my construction may be injured, and the remaining ones will expand sufficiently to render the tire firm enough for continued use.

The devices for accomplishing the purposes herein set forth will be hereinafter specifically described.

Figure 1:
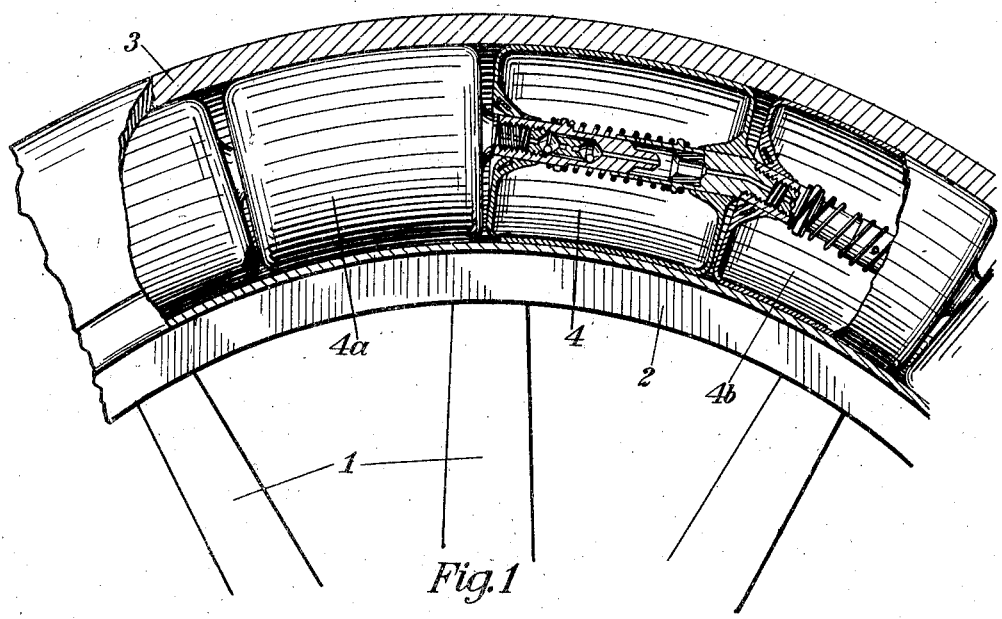
Figure 2:
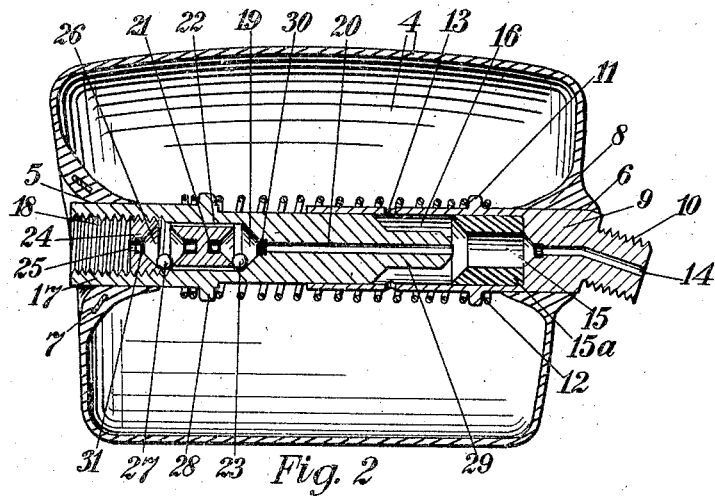
Figure 3:
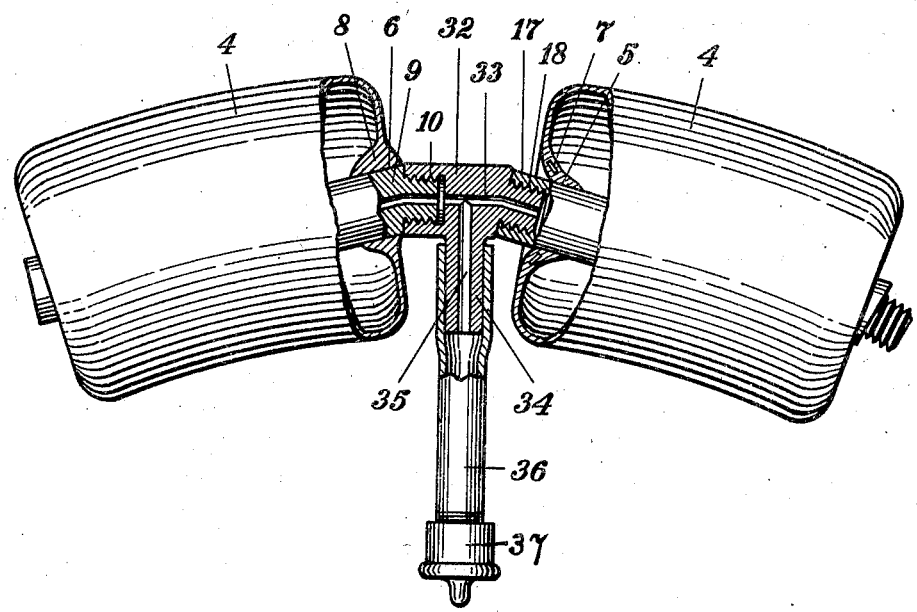

In the drawings, which accompany this description and form a part of this specification, Figure 1 is a section through a portion of a wheel and tire equipped with my sectional inner tube; Fig. 2 is a longitudinal sectional view of one of the sections or elements making up the complete inner tube; Fig. 3 shows the connections for inflating the inner tube.

Referring to the drawings, 1 is the spokes of a vehicle wheel; 2 the rim secured thereon; 3 is an elastic tire constructed in the usual manner; 4 is a section of the inner tube which in my construction is made up of a plurality of sections practically identical, and mounted and connected together in a manner now to be described. Each section is provided with the end openings 5 and 6, the walls of the opening 5 being reinforced as shown by the wire 7, and the walls of the opening 6 being formed with the reinforcing flange 8; through the opening 6 is inserted the metallic member 9 provided with the external threads 10, and having the annular flange 11 formed thereon to receive and position the spiral spring 12. The opening or series of openings 13 arranged circumferentially of the member 9 permit passage therethrough into the section 4 of the air being used to expand the section. Internally, the member 9 is bored to provide the passageway 14, which opens at 15 into the tubular portion 16.

A separate cylindrical member 15$^a$ is shown positioned in the tubular portion 16 of the member 9. It is apparent that the member 9 might be bored to produce the internal opening therethrough shown in Fig. 2, but it would be more expensive than to provide the separate tubular member 15$^a$ positioned in the tubular portion of member 9. It is also apparent that the member 15$^a$ may be readily positioned in the member 9 before the parts are assembled.

Positioned in the opening 5 is a member 17, which is internally threaded at 18 to receive the externally threaded end of the member in an adjacent section corresponding to the member 9 above described. The member 17 is channeled beyond the threaded portion as shown at 19, and the passageway 20 extends from the channeled portion to the opposite end; within the channeled portion 19 is placed a notched member 21, in such manner that a passageway 22 is left around the same for the ingress and egress of air used in inflating the sections. The position of notched member 21 in the channeled portion 19 is such that a space is left on the inner side thereof for a ball 23 which operates as a valve to stop the flow of air through the passageway 20 at certain times, which will be hereinafter described. There is screwed into the end of member 17 an externally threaded member 24 which has a passageway 25 therethrough connecting with the air passageway in the member in the adjacent section corresponding to the member 9 described above; between the member 24 and the notched member 21 is left the space 26 in which is positioned a ball 27 which operates as a valve to stop the passageway 25 under certain conditions hereinafter described; the ball 23 is placed in the channel portion 19, the notched member 21 is next moved into position, as shown, the ball 27 is next positioned, and the threaded stop member 24 is then turned to its desired position; when the parts are thus assembled, the member 17 is inserted through the opening 6, which expands sufficiently to take over the flange 28, thereby admitting the member 17, and the end thereof beyond the flange 28 is inserted through the opening 5, as appears in Fig. 2. Thereupon, the spring 12 is positioned upon the member 17 in such manner that member 17 may be rotated thereon and secured over the flange 28; the member 9 is then introduced through the opening 6 and receives the end portion 29 of the member 17 in its tubular portion 16, the spring 12 being positioned over the flange 11. Normally, the parts will be positioned telescopically with relation to each other approximately as appears in Fig. 2, leaving the openings 13 unobstructed and in communication with the passageways 14 and 20. A section similar to 4 is then assembled in a similar manner and the extension corresponding to 10 thereon is then screwed into the internally threaded portion 18 of member 17, thereby uniting the two sections firmly together; it is noted that the extension 10 is inclined to accommodate the rigid members to the proper curvature of the elastic outer tube 3. When the sections are all assembled in this way, air is introduced with a force pump, and I have illustrated in Fig. 3 a device to which the force pump may be attached:

32 is a member adapted to be screwed upon the members 9 and 17, and is bored to provide the air passageway 33; the stem 34 is bored at 35, and over the said stem is fitted the tube 36 closed at the free end with the screw cap 37. The force pump is connected with tube 36 after the removal of cap 37, and the air then flows through the passageway 14, the tubular portion 16, and the openings 13 until the section 4 is expanded as desired, whereupon it flows through the passageway 20 into the channeled portion 19 around the notched member 21 through the passageway 22, into the channeled portion 26 and through the passageway 25 into the connecting passageway corresponding to 14, and so on into the adjacent section which is filled in a similar manner. It will be understood that some of the air will pass onwardly through the passageway 20 at the same time that the air is entering through the openings 13 into the section 4, so that normally the air is passing into all of the sections at the same time. The spiral spring 12 is of such length and such adjustment that the metallic members 9 and 17 are held in approximately the relation shown in Fig. 2. It will be seen that the balls 22 and 27 offer practically no interference to the passage of the air when the sections are being expanded.

Assume that all of the sections have been inflated and the tire is in use; suppose the outer tire 3 is punctured and an opening is thereby made through section 4; the air at once begins to escape, and section 4 tends to shrink. The escape of the air will induce the air confined in the other sections to escape into section 4, but this is prevented from the direction of section 4$^a$ (see Fig. 1) by the ball 23; this, by the swift inflow of the air from section 4$^a$ will be driven into the seat 30 in the passageway 20, thereby closing the same to the admission of air from that side. The air tending to enter from section 4$^b$ will operate to force the ball corresponding to 27 into the seat corresponding to 31 in the passageway 25, thereby preventing the passage of air in that direction. Consequently, in this manner, the air is prevented from escaping from the adjacent sections into the punctured section. As the punctured section shrinks, the air in the adjoining sections will expand, and here it should be said that the sections are so constructed and united that when the inner tube is inflated, the sections contact with each other at their ends, and press against each other with some force. Therefore, the sections adjacent to the punctured one may expand, which expansion will thereupon extend through all of the remaining sections, and consequently the movement of the rubber sections upon the metallic connections will permit the expansion of the adjacent rubber sections into the space, in great part, occupied by the shrunken or punctured section 4. The expansion of the adjacent sections will cause the telescoping members 9 and 17 to move together, thereby bringing the body of member 17 farther into the tubular portion 16 and the end portion 29 will enter the channeled portion of 15$^a$. In this position of the parts, the openings 13 will be entirely closed by the member 17, which will still further operate to prevent the passage of air from adjoining and other sections into the punctured one, at the same time effecting a juncture between the passageways 14 and 20, which will permit the uninterrupted communication of air therethrough around the circle of the inner tube. When this telescoping action has proceeded sufficiently to close the openings 13, air communication between section 4 and the other sections will be cut off, whereupon the balls acting as valves, 23 and 27, will be relieved of the pressure thereon, described above, and will accordingly fall out of their seats and settle into approximately the position indicated in Fig. 2, the air pressure having become normal throughout the inner tube. It will be understood that the ball corresponding to 27, which has been lifted into its seat, is found in section 4$^b$. When it is desired to deflate the sections of the inner tube, the air may be permitted to escape outwardly through the valve through which it has entered, in the usual way.

Variations of my construction may be made, and I do not therefore confine myself to the specific forms illustrated and described. The essential features of my invention are seen to be the telescoping members having the passageways therethrough, the mounting of the spring thereon, the mounting of the rubber section thereon, in such manner that it will permit of some longitudinal movement thereon due to expansion or contraction thereof, the provision of the valves and the means for confining the same within the appropriate region where they are ready for use when the conditions arise, and the means for readily uniting the various metallic members securely in a continuous ring upon which the rubber sections are mounted.

What I claim is:

1. In a sectional tube, an elastic hollow member having openings therethrough, rigid members adapted to be positioned within these openings in telescopic relation, and resilient means for maintaining said members in the desired relative position.

2. In a sectional tube, an elastic hollow member having openings therethrough, rigid members adapted to be positioned within these openings in telescopic relation, and resilient means for maintaining said members in the desired position, there being a passageway provided through such members, and means for obstructing said passageway.

3. In a sectional tube, an elastic hollow member having openings therethrough, rigid members adapted to be positioned within these openings in telescopic relation, and resilient means for maintaining said members in the desired position, there being a passageway provided through such members, and means for obstructing said passageway, one of said members having openings therethrough communicating with said passageway.

4. In a sectional tube, an elastic hollow member having openings therethrough, rigid members adapted to be positioned within these openings in telescopic relation, and resilient means for maintaining said members in the desired position, there being a passageway provided through such members, and means for obstructing said passageway, one of said members having openings therethrough communicating with said passageway when said rigid members are in normal position, said openings being adapted to be obstructed when the members are abnormally telescoped.

5. In a sectional tube, an elastic hollow member having openings therethrough, rigid members inserted through said openings in telescopic relation, there being a communicating passageway through said members, one of said members having a hollowed portion forming a part of said passageway, a notched member positioned in said hollow portion, and closure means for said passageway placed on opposite sides of said notched member.

6. In a sectional tube, an elastic hollow member having openings therethrough, rigid members inserted through said openings in telescopic relation, there being a communicating passageway through said members, one of said members having a hollowed portion forming a part of said passageway, a notched member positioned in said hollow portion, a closure means for said passageway placed on opposite sides of said notched member, a second member placed within said hollowed portion and having a communicating passageway therethrough.

7. In a sectional tube, an elastic hollow member having openings therethrough, rigid members positioned telescopically therein and having a communicating passageway therethrough, spaced apart members positioned in said passageway, and closure means for said passageway confined therein by said spaced apart members.

8. In a sectional tube, an elastic hollow member having openings therethrough, rigid members having a passageway therethrough arranged in telescopic relation in said openings, a member placed in said passageway to permit the passage of air therearound, a second member placed in said passageway, ball valves for said passageway placed therein on opposite sides of said first mentioned member therein.

9. A sectional inner tube for pneumatic tires comprising inflatable sections having openings therethrough, rigid members in telescopic relation inserted through said openings and connected to corresponding rigid members in the adjacent sections, there being a continuous passageway through said rigid members.

10. A sectional inner tube for pneumatic tires comprising inflatable sections having openings therethrough, rigid members in telescopic relation inserted through said openings and connected to corresponding rigid members in the adjacent sections, there being a continuous passageway through said rigid members, and openings through one of said members affording communication between said section and said passageway.

11. A sectional tube for pneumatic tires comprising inflatable sections having reinforced openings therethrough, rigid members arranged in telescopic relation with each other in said openings, resilient means mounted on said members to prevent excessive telescoping, means for uniting said rigid members to the rigid members of adjacent sections, whereby a continuous ring-like structure is formed having a passageway therethrough and provision in each section for communication between said passageway and said section.

12. A sectional inner tube for pneumatic tires comprising a plurality of inflatable sections having openings therethrough, rigid telescoping members positioned in said openings, a resilient member arranged thereon to determine the relative position of said members, means for connecting said rigid members with similar members in the contiguous sections, there being a continuous passageway through said connected rigid members, means for forcing air into said passageway into said sections, and means for cutting off communication through said passageway between a given section and the contiguous sections.

13. A sectional inner tube for a pneumatic tire comprising a plurality of inflatable sections having openings therethrough, telescoping members placed through the openings in each section having a communicating passageway therethrough and means for communication between said passageway and the interior of said section, means for connecting the telescoping members of each section with similar members in the contiguous sections, whereby a continuous passageway is formed through said sections, and means for obstructing said passageway to prevent the flow of air into any desired section.

14. In a sectional tube, an elastic hollow member having openings therethrough, rigid members positioned telescopically therein and having a communicating passageway therethrough, and closure means for said passageway confined therein.

In testimony whereof I affix my signature in the presence of two witnesses.

FRANCIS R. BAYLIS.

Witnesses:
A. T. BENSON,
G. L. MOWRY.